Oct. 12, 1965 H. B. COLE 3,211,540
METHOD AND APPARATUS FOR FUSING FIBER
OPTICAL IMAGE TRANSFER DEVICES
Filed Nov. 18, 1960 2 Sheets-Sheet 2

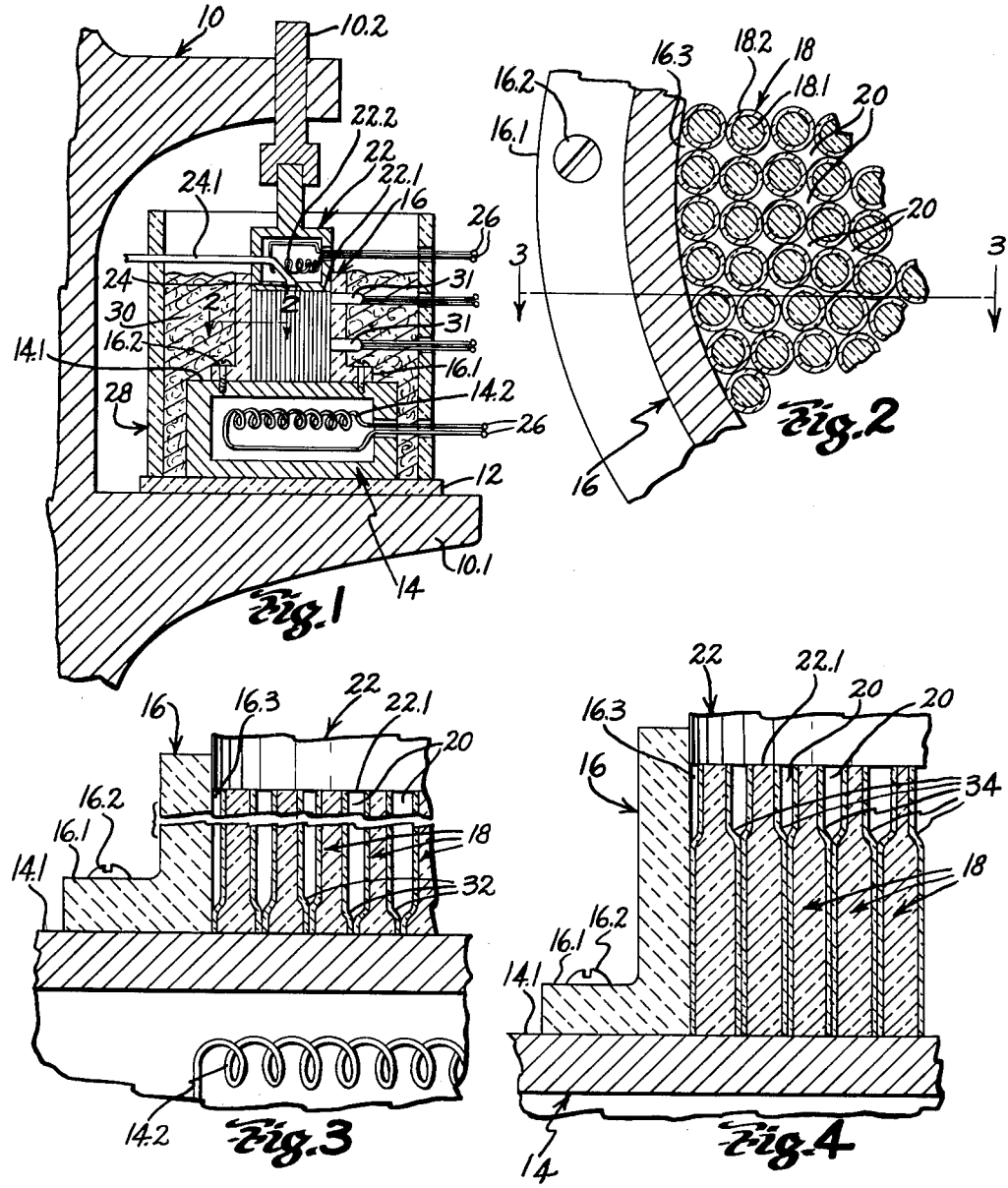

INVENTOR
HENRY B. COLE
BY Louis L. Gagnon
James P. M. Andrews
ATTORNEYS 3,211,540
METHOD AND APPARATUS FOR FUSING FIBER OPTICAL IMAGE TRANSFER DEVICES
Henry B. Cole, East Woodstock, Conn., assignor to American Optical Company, Southbridge, Mass., a voluntary association of Massachusetts
Filed Nov. 18, 1960, Ser. No. 70,194
14 Claims. (Cl. 65—4)

The field of this invention is that of fiber optical image transfer devices and the invention relates more particularly to novel and improved methods and apparatus for fusing a plurality of light-conducting fibers together to form a fiber optical image transfer device.

In the formation of fiber optical image transfer devices, it is desirable to fuse light-conducting fibers together in compact, side-by-side bundled relation. In achieving this result, it is desirable to bring about the fusing of the fibers in such a manner that all interstices between the fibers will be eliminated and that entrapment of air bubbles and the like between the fibers will be prevented. It is also advantageous to fuse the fibers without substantially altering the relative cross-sectional areas of the fibers. At the present time, various methods and apparatus for forming fused fiber optical image transfer devices are known by which interstices between the fibers can be eliminated and by which the entrapment of bubbles between the fused fibers can be prevented. However, such methods and apparatus are of limited application in that they are only capable of producing devices of this sort which are relatively small in cross-sectional area and in that they tend to distort the relative cross-sectional size of the fibers embodied in the device.

It is an object of this invention to provide novel and improved methods and apparaus for manufacturing fiber optical image transfer devices; to provide such methods and apparatus by which a plurality of light-conducting fibers can be fused in compact, side-by-side relation; to provide such methods and apparatus by which light-conducting fibers can be fused together to eliminate interstices therebetween without risk of entrapment of bubbles between the fibers; to provide such methods and apparatus by which devices of the character described can be simply and inexpensively manufactured; to provide such methods and apparatus by which a plurality of light-conducting fibers can be fused in side-by-side relation to form a fiber bundle of relatively large cross-sectional area without incurring distortion of the relative cross-sectional size of the respective fibers; and to provide such methods and apparatus by which a plurailty of light-conducting fibers can be fused to each other and to a surrounding metal mounting sleeve in a simple and inexpensive manner.

Briefly described, the method provided by this invention for fusing light-conducting fibers to form a fiber optical image transfer device comprises the step of assembling the fibers in side-by-side relation to form a bundle, enclosing the bundle for holding the fibers in said bundled relation, heating the fibers to fusing temperature, and causing the opposite ends of the fibers to move axially toward each other for bulging the fibers into intimately fused relation.

In a preferred method according to this invention, the light-conducting fibers are of relatively uniform length and are assembled in side-by-side relation to form a bundle. The bundle is then enclosed for holding the fibers in said bundled relation, thereby to define the ultimate cross-sectional size of the fiber bundle. If desired, the assembled fibers can be preheated in an oxidizing atmosphere for burning off impurities which may be disposed between the fibers, and, also if desired, the atmosphere surrounding the fiber can be drawn off for creating at least a partial vacuum between the fibers. The fibers can then be heated in such a manner as to establish at least a temporary temperature gradient therein so that the fibers are first heated to a fusing temperature in a plane transversely of the fibers, preferably at one end of the fibers, and are then heated to a fusing temperature outwardly from said plane along the lengths of the fibers. At the same time, axial pressure is applied to the fibers for bulging portions of the fibers into intimately fused relation as said portions are heated to fusing temperature. For example, the fibers can be abutted adjacent the ends which are first heated to a fusing temperature and axial pressure can be applied to the opposite ends of the fibers so that the fibers will first bulge into intimately fused relation at said abutted ends and will then bulge progressively along the lengths of the fibers as portions thereof are heated to fusing temperature, thereby to progressively close interstices between the fibers from one end so that entrapment of air bubbles and the like between the fibers cannot occur. If desired, after permitting the fibers to cool, the ends of the fibers can be abraded to remove irregularly bulged portions at the fiber ends such as might have been caused by slight differences in fiber lengths. The fiber ends are also preferably polished for rendering them readily receptive to light.

In a practical method of this invention, the fibers are bundled and enclosed as described above and are then heated so that the fibers are heated to a fusing temperature only in a plane extending transversely of the fibers at one end. At the same time, axial pressure is applied to the fibers for bulging the fibers into fused relation at said end. The fibers are then permitted to cool and are reheated to fusing temperature in a plane extending transversely of the fibers at the opposite end. Axial pressure is again applied to the fibers for bulging the fibers into fused relation at said opposite end, thereby fusing the fibers together at each end while leaving the fibers unfused between the fiber ends.

In an alternate method of this invention, fibers embodying a core of a material of relatively high index of refraction and a cladding of a material of reltively low index of refraction can be assembled within a metallic sleeve preferably having an inner coating adapted to fuse with said material of low index of refraction. The fibers can then be heated and bulged in the manner described above for fusing the fibers to each other and to the coating within the sleeve, thereby to provide a fiber optical image transfer device having a metallic mounting sleeve fused thereto.

The apparatus provided by this invention includes forming means adapted to enclose the periphery of a bundle of light-conducting fibers for holding the fibers in a bundled relation and for defining the ultimate cross-sectional shape of the bundle. Means are also provided for heating the fibers to a fusing temperature and for applying axial pressure to the fibers, thereby to bulge the heated fibers into intimately fused relation with each other.

In a preferred embodiment, the apparatus provided by this invention comprises a base member, a forming member preferably of refractory material mounted against the base member, the forming member having an inner chamber, for example, and bing adapted to enclose the periphery of a bundle of light-conducting fibers for holding the fiber ends in abutting relation with the base member, means for heating the base member to establish at least a temporary temperature gradient in the fibers so that the fibers are first heated to a fusing temperature in a plane extending transversely of the fibers adjacent the base member and are then heated to a fusing temperature progressively along the length of the fibers, and means for simultaneously applying axial pressure to the fibers for bulging the fibers into fused relation as they are heated to fusing temperature. If desired, said means for applying axial pressure can include a press member adapted to slide within the forming member chamber for engaging the fibers. Also, if desired, the press member can be adapted to seal the forming member chamber and can incorporate a vent passage extending exteriorly of the chamber. In this construction, the apparatus can also include means for establishing an oxidizing atmosphere within the chamber through the vent passage. The heating means can then be used for preheating the fibers in said oxidizing atmosphere for burning off impurities between the fibers. Additional means can also be provided for thereafter drawing off the atmosphere surrounding the fibers through the vent passage to create at least a partial vacuum within the forming member chamber, and the fibers can then be fully heated and bulged as above described.

In a practical embodiment of this invention, the apparatus includes a base member, means for detachably mounting a metallic sleeve against the base member so that the sleeve is adapted to receive and enclose a bundle of light-conducting fibers with the fiber ends abutting the base member, means for heating the fibers to establish the above-described temporary temperature gradient therein, and means for simultaneously applying axial pressure to the fibers for bulging portions of the fibers into fused relation with each other and with the sleeve as they are heated to fusing temperature.

Other objects, advantages and details of the methods and apparatus provided by this invention will appear in the following, more detailed description thereof, the detailed description referring to the drawings in which:

FIG. 1 is a section view along the vertical axis of the apparatus provided by this invention;

FIG. 2 is a partial section view to enlarged scale along line 2—2 of FIG. 1;

FIG. 3 is a partial section view to enlarged scale along line 3—3 of FIG. 2;

FIG. 4 is a view similar to FIG. 3 showing a more advanced stage in the process of forming a fiber optical image transfer device according to this invention;

Figure 6:
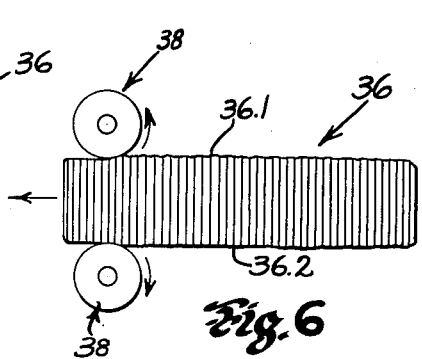
Figure 7:
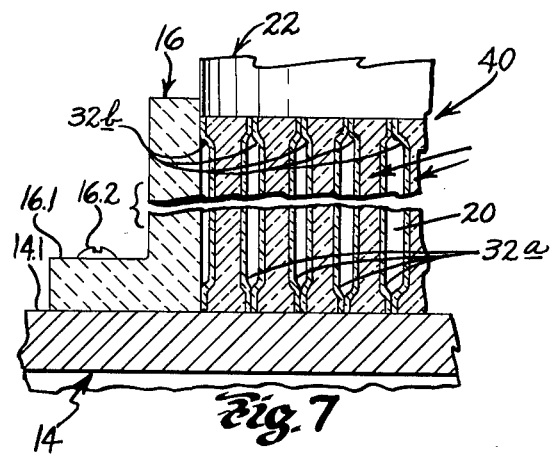
Figure 8:
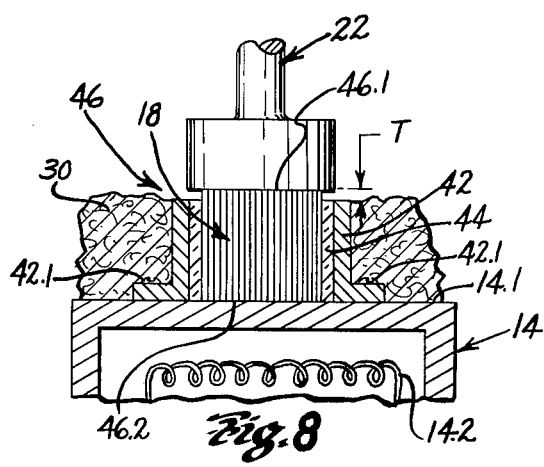

FIG. 6 diagrammatically illustrates a final step in manufacture of an image transfer device according to this invention;

FIG. 7 is a view similar to FIG. 3 showing a step in manufacturing an image transfer device according to an alternate method provided by this invention; and FIG. 8 is a partial section view similar to FIG. 1 showing a step in manufacturing an image transfer device according to an alternate method of this invention.

Referring to the drawings, FIGS. 1–6 illustrate the preferred apparatus and method provided by this invention for manufacturing a fiber optical image transfer device. As shown in FIG. 1, the apparatus can include a conventional arbor press 10 or other suitable means having a platform or work-supporting table 10.1 positioned beneath an arbor press shaft 10.2, the shaft being adapted to be moved in the direction of the platform with considerable force in conventional manner. A sheet 12 of hard, heat-insulating material such as fiberboard can preferably be positioned upon the platform 10.1 and a base or anvil member 14 can be rested thereon in alignment with the path of movement of the shaft 10.2. The base member can comprise any conventional type of heating unit having a flat-surfaced top portion 14.1 which is adapted to support a substantial compressive load and which incorporates heating elements such as the conventional resistance coil 14.2 adapted to radiate heat through said top portion. If desired, the base member can be secured to the platform 10.1 in any suitable manner.

A sleeve 16 is mounted upon the base member top portion and is preferably secured in position to form a relatively tight seal between the sleeve and the base member. For example, the sleeve can be provided with a flanged portion 16.1 which is detachably connected to the base member by screws 16.2 as shown. The sleeve member 16 can be of any desired cross-sectioned configuration either curvilinear or rectilinear, regular or irregular, in contour and is preferably, but not necessarily, formed of a refractory material. For example, the sleeve can be formed of the refractory material described in U.S. Patents Nos. 2,440,187 and 2,764,491, such refractory material having suitable strength, a high degree of dimensional stability, and being characterized in that it does not stick to melted glass. The sleeve 16 is provided with a chamber 16.3 and comprises a forming member in which a plurality of fibers 18 can be assembled in side-by-side relation to form a bundle with the ends of the fibers in abutting relation to the top portion 14.1 of the base member. In this arrangement, the sleeve 16 holds the fibers in said bundled relation and defines the ultimate cross-sectional configuration of the bundle.

For forming a fiber optical image transfer device, the fibers 18 can embody cores 18.1 of heat-softenable light-transmitting material such as glass or plastic having a relatively high index of refraction and can embody claddings 18.2 of a similar material having a relatively low index of refraction. For example, the fiber cores can be formed of flint glass of 1.62 index of refraction and can be provided with claddings of crown glass of 1.52 index of refraction in well known manner, whereby the fibers are adapted to receive light within the cores at one end and are adapted to conduct said light to the opposite ends of the fibers by means of total internal reflection. The fibers 18 are preferably cut to relatively uniform length before they are positioned in the sleeve chamber 16.3 and are then positioned in the chamber in closely packed relation as shown in FIG. 2. However, because such fibers are normally but not necessarily round and because packing of the fibers in very compact relation within the sleeve will be somewhat difficult, there will normally be spaces 20 between the fibers, these spaces being distributed fairly uniformly throughout the fiber bundle. The fibers are preferably of a suitable diameter so that they have some degree of rigidity and can be conveniently packed in side-by-side relation as described, but the fibers can be of any desired diameter within the scope of this invention.

According to this invention, a press member 22 is mounted upon the arbor press shaft 10.2 in any conventional manner and is proportioned to be moved axially with the shaft to slide within the sleeve chambers 16.3. Preferably, the press member fits tightly within the sleeve chamber 16.3 so that, although the press member is free to move therein, a substantially tight seal will be formed between the press member and sleeve. The press member is preferably provided with a flat-surfaced bottom portion 22.1 and incorporates heating elements such as conventional resistance coil 22.2 adapted to radiate heat through said bottom portion. Preferably, also, the press member has a passage 24 formed, for example, by a tube 24.1 of stainless steel or the like which extends through the bottom portion of the press member into the otherwise sealed sleeve chamber 16.3.

In this arrangement, the heating coils 14.2 and 22.2 can be energized through the terminals 26, which represent a source of electrical current in well known manner, for heating the sleeve 16 and the fibers 18 disposed therein. To facilitate such heating, the sleeve base member and press member are preferably encircled by a cylinder 28 of heat-insulating material such as fiberboard which can be loosely packed with any suitable heat-insulating material 30 such as asbestos fibers adapted to withstand relatively high temperatures. The heat provided by said coils acn be first adapted to preheat the fibers 18 to a suitable temperature for burning off impurities such as dust and the like which may be trapped between the fibers. For this purpose, air or pure oxygen or the like can be directed through the tube 24.1 into the sleeve chamber 16.3 by any conventional means (not shown) to facilitate burning off of said impurities. The current supply to the heating element of at least the base member can then be increased so that the fibers 18 are heated in such a manner as to establish at least a temporary temperature gradient in the fibers. Conventional thermocouples or other temperature detecting means 31 can be associated with the sleeve 16 at spaced locations as shown for facilitating control of the described temperature gradient. In establishing said temperature gradient, the base member heater is adjusted so that it is adapted to first heat the fibers to a fusing temperature in a plane extending transversely of the axes of the fibers 18 adjacent the top portion 14.1 of the base member and is then adapted to heat the fibers to fusing temperature progressively along the lengths of the fibers.

At the same time that the fibers are brought to fusing temperature, the arbor press is operated to force the press member 22 downwardly, thereby to exert an axial pressure on each of the fibers 18. As shown in FIG. 3, since the fibers 18 are first brought to a fusing temperature in a plane extending along the top surface of the base member, the axial pressure applied to the fiber tends to bulge the fibers uniformly in that plane, as at 32, to fill interstices therebetween and to fuse the fibers together. When the fibers have been bulged into contact with the fibers adjacent thereto in said plane, the hydrostatic pressure thereby established will prevent further bulging of the fibers so that the cross-sectional area of the fibers will increase only to the slight extent necessary to fill interstices between the fibers in said plane and will not tend to bulge to enlarge the cross-sectional area of some fibers more than others. As further heating of the fiber occurs, bulging of the fibers under axial pressure will move progressively up the fibers, as shown at 34 in FIG. 4, for sweeping air or other gases upwardly from between the fibers, thereby preventing entrapment of the gases between the fibers and preventing the formation of bubbles and the like which might reduce the effectiveness of the fibers in transmitting light. To further reduce the possibility that gases could be entrapped between the fused fibers, any conventional vacuum pump means (not shown) can be attached to the tube 24.1 for evacuating all gases from the chamber 16.3 either preliminarily or as the gases are squeezed from between the fibers 18 by the above-described fusing process. It will be noted that where there are slight differences in the lengths of the fibers, the longer fibers will be bulged slightly more rapidly at first until all the fibers are compressed to equal length and that thereafter the fibers will be bulged uniformly. It will also be noted that as originally packed in the sleeve 16, the fibers define spaces 20 which are uniformly distributed throughout the bundle of fibers. Accordingly, the fibers will generally tend to bulge to a uniform extent and will retain their relative positions and proportions with respect to cross-sectional area regardless of the size or cross-sectional configuration of the bundle in which the fibers 18 are assembled.

Where the fibers 18 embody flint and crown glasses as above described, the glasses can be heated to approximately 1150° F. for fusing the fibers and can be bulged uniformly with an applied axial pressure of approximately 200 pounds per square inch.

Figure 5:
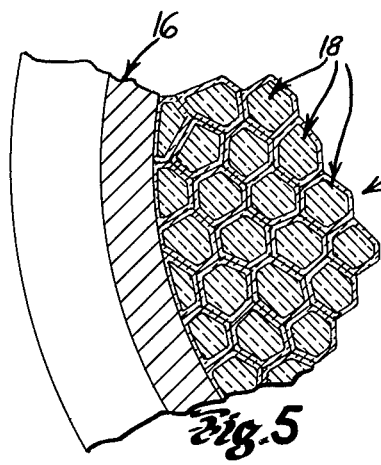
FIG. 5 is a view similar to FIG. 2 showing a fiber optical image transfer device as manufactured in accordance with this invention.

After fusing of the fibers throughout their full length, the fused fibers will appear as illustrated in FIG. 5 and can be permitted to cool for removal from the sleeve 16. If desired, the fibers can be wrapped in gold-leaf or the like when originally positioned in the sleeve chamber, thereby to facilitate removal of the fibers from the sleeve after fusing. Also, the sleeve 16 can be formed in more than one separable piece if desired for further facilitating ultimate removal of the fused fibers from the sleeve. The fused fiber bundle 36 can then be passed between conventional rotating abrading wheels or other suitable surfacing tools 38, for example, for grinding or otherwise abrading the fiber ends in the device faces 36.1 and 36.2 to remove irregularly bulged portions which may have developed on the fiber ends due to irregularities of the original length of the fibers. The fiber ends are also polished in conventional manner for rendering them readily receptive to light.

In the above description of a preferred embodiment of the method and apparatus provided by this invention, the light conducting fibers 18 have been said to embody light-transmitting cores of flint glass having claddings of crown glass which are adapted to be fused under a specified pressure at a temperature of approximately 1150° F. It should be understood that such fibers can embody other combinations of light-transmitting glass or plastic materials which should be fused at other temperatures, the fusing temperature for each such combination of fiber materials being selected so that said materials can be fused without causing the individual fiber cores and claddings to lose their identities. It should also be noted that, in fusing the fibers according to the method of this invention very little bulging or expansion of the individual fibers will be required for filling all interstices therebetween. For example, where round fibers are enclosed in the sleeve 16, the interstices between fibers will only occupy between 10% and 15% of the total volume of the fiber bundle. In this regard it should be noted that the fibers would normally be packed more compactly in the sleeve 16 than is shown in FIG. 2, the fibers being shown in loosely packed relation therein for convenience of illustration.

FIG. 7 illustrates an alternative embodiment of the method provided by this invention. According to this alternative method, the fibers 18 are processed as above described with reference to FIGS. 1–3 so that as shown in FIG. 7, the fibers are bulged as at 32a for fusing the fibers together adjacent the top portion 14.1 of the base member. The current supply to the heater coil 14.2 is, however, then reduced for permitting the fibers to fall below fusing temperature before the fibers are bulged along any substantial part of their length. Current supply to the press member heater coil 22.2 is then increased so that the fibers are heated to fusing temperature only in a plane extending transversely of the fiber axes adjacent the bottom portion 22.1 of the press member. At this time, the arbor press is again operated for applying an axial pressure to the fibers so that the fibers will bulge as at 32b as shown in FIG. 7, thereby to fuse the fibers together adjacent the bottom portion of the press member. This provides a fiber optical image transfer device 40 embodying light-conducting fibers which are fused in compact relation at each end but which are not fused together intermediate the fiber ends.

Another alternative embodiment of the method of this invention is illustrated in FIG. 8. According to this embodiment of the invention, there is provided a metal sleeve 42 similar to the sleeve 16 above described, the sleeve 42 being of a material such as the type commercially known as No. 430 stainless steel for example which is adapted to form a high quality glass-to-metal seal. The sleeve is preferably provided with a fused inner coating of a suitable glass material in any conventional manner. For example, the inner sleeve surface can be coated with a suitable glass frit which can be fired in conventional manner for forming a fused glass-to-metal seal. The sleeve can then be mounted upon the base member 14, for example by screws 42.1, in the manner described above with reference to the sleeve 16. Preferably, where the sleeve is adapted to receive glass-clad light-conducting fibers 18 therein, the glass-coating on the sleeve is formed of the same material with which the fibers are clad. Where the sleeve and coating are formed of the materials described, the glass coating can be fused to the sleeve at a temperature of approximately 1450° F. Of course, any other suitable method for providing a metal sleeve having an inner glass coating is within the scope of this invention.

The sleeve 42 can then be filled with a plurality of fibers 18 in the manner described above with reference to FIG. 2. The fibers should be of relatively uniform length and preferably but not necessarily extend a very short distance T above the sleeve 42 as shown in FIG. 9. For example, where the fibers are of approximately 0.050 in diameter, the fibers preferably extend above the sleeve for a distance equal to between 5% and 15% of the length of the fibers. Then the press member 22 can be mounted upon the arbor press shaft 10.2 and can be lowered into engagement with the fibers 18.

The heating elements 14.2 and 22.2 in the base and press members respectively, can then be connected to a source of current for heating the fibers 18 and the sleeve 42 to establish a temporary temperature gradient therein as described above with reference to FIGS. 1–5. At the same time, the arbor press shaft 10.2 can be forced downwardly for applying an axial pressure on the fibers 18, thereby to bulge the fibers into intimately fused relation with each other as is also above described. As will be readily understood, the fibers 18 will also be bulged into fused relation with the glass coating on the sleeve 42, thereby to form the fiber optical image transfer device 46 which has a metal mounting sleeve 42 fused thereon. The device 46 can then be permitted to cool and can be detached from the base member 14 to permit abrading of the device surfaces 48.1 and 48.2 in the manner described above with reference to FIG. 6.

It should be understood that where the sleeve 42 and the fibers 18 have the physical and dimensional characteristics above described, axial pressure applied to the fibers 18 during bulging of the fibers into fused relation will reduce the spacing T so that the faces 46.1 and 46.2 of the device 46 will be approximately flush with the ends of the sleeve 42. Where it is desired to provide a bundle of fibers 18 with a mounting sleeve similar to sleeve 42 which does not extend the full length of the fibers, the fiber bundle can be enclosed in a forming means comprising a combination of the metal sleeve similar to sleeve 42 and of refractory sleeve portions similar to sleeve 16 as will be understood.

It should be understood that although preferred embodiments of the methods and apparatus of this invention have been described for the purpose of illustration, this invention includes all modifications and equivalents thereof which fall within the scope of the appended claims.

Having described my invention, I claim:

1. A method of fusing light-conducting fibers comprising the steps of assembling a plurality of said fibers of relatively uniform length in side-by-side relation to form a bundle, enclosing the bundle completely around its periphery for holding said fibers in said bundled relation, heating the fibers to fusing and softening temperature, and axially compressing the opposite fiber ends for bulging the softened fibers into intimately fused relation.

2. A method of fusing light-conducting fibers comprising the steps of assembling a plurality of said fibers of relatively uniform lengths in side-by-side relation to form a bundle, enclosing the bundle for holding said fibers in said bundled relation, heating the fibers in such a manner as to establish at least a temporary temperature gradient therein so that the fibers will be first heated to a fusing temperature in a plane extending transversely of the fibers and will then be heated to a fusing temperature progressively outward from said plane along the lengths of the fibers and simultaneously applying axial pressure to the fiber ends for bulging the fibers into intimately fused relation as they are heated to fusing temperature.

3. A method of fusing light-conducting fibers comprising the steps of assembling a plurality of said fibers of relatively uniform length in side-by-side relation to form a bundle, enclosing the bundle for holding said fibers in said bundled relation, heating the fibers in such a manner as to establish at least a temporary temperature gradient therein so that the fibers will be first heated to a fusing temperature in a plane extending transversely of the fibers at one end of the fibers and will then be heated to a fusing temperature progressively along the fiber lengths from said plane, abutting the fibers at said one end, and simultaneously applying axial pressure against the opposite ends of the fibers for bulging portions of the fibers into intimately fused relation as they are heated to fusing temperature, thereby to eliminate interstices between the fibers.

4. A method of forming a fiber optical image transfer device, said method comprising the steps of assembling a plurality of light-conducting fibers of relatively uniform length in side-by-side relation to form a bundle, enclosing the bundle for holding said fibers in said bundled relation, heating the fibers in such a manner as to establish at least a temporary temperature gradient therein, so that the fibers will be first heated to a fusing temperature in a plane extending transversely of the fibers at one end of the fibers and will then be heated to a fusing temperature in a plane extending transversely of the fibers at one end of the fibers and will then be heated to a fusing temperature progressively along the fiber lengths from said plane, abutting the fibers at said one end, simultaneously applying axial pressure against the opposite fiber ends for bulging portions of the fibers into intimately fused relation as they are heated to fusing temperature, and abrading the ends of said fused fibers for removing irregularly bulged portions at the ends thereof and for finishing the fiber ends to render the fibers readily receptive to light.

5. A method of forming a fiber optical image transfer device, said method comprising the steps of assembling a plurality of light-conducting fibers of relatively uniform length in side-by-side relation to form a bundle, enclosing the bundle for holding said fibers in said bundled relation, preheating the fibers in an oxidizing atmosphere for burning off impurities therebetween, heating the fibers in such a manner as to establish at least a temporary temperature gradient therein so that the fibers will be first heated to a fusing temperature in a plane extending transversely of the fibers at one end of the fibers and will then be heated to a fusing temperature progressively along the fiber lengths from said plane, abutting the fibers at said one end, at the same time pressing axially against the fibers at the opposite ends thereof for bulging portions of the fibers into intimately fused relation as they are heated to fusing temperature, and abrading the ends of said fibers for removing irregularly bulged portions at the ends thereof and for rendering the fibers readily receptive to light.

6. A method of forming a fiber optical image transfer device, said method comprising the steps of assembling a plurality of light-condensing fibers of relatively uniform length in side-by-side relation to form a bundle, enclosing the bundle for holding said fibers in said bundled relation, preheating the fibers in an oxidizing atmosphere for burning off impurities therebetween, drawing off said atmosphere for creating at least a partial vacuum between said fibers, heating the fibers in such a manner as to establish at least a temporary temperature gradient therein so that the fibers will be first heated to a fusing temperature in a plane extending transversely of the fibers at one end of the fibers and will then be heated to a fusing temperature progressively along the fiber lengths from said plane, abutting the fibers at said one end, at the same time, pressing axially against the fibers at the opposite ends thereof for bulging portions of the fibers into intimately fused relation as they are heated to fusing temperature, and abrading the ends of said fibers for removing irregularly bulged portions at the ends thereof and for rendering the fibers readily receptive to light.

7. A method of forming a fiber optical image transfer device, said method comprising the steps of assembling a plurality of light-conducting fibers of relatively uniform length in side-by-side relation to form a bundle, enclosing the bundle for holding said fibers in said bundled relation, heating the fibers in such a manner as to establish a temperature gradient therein so that the fibers will be heated to a fusing temperature only adjacent a plane extending transversely of the fibers at one end of the fibers, simultaneously applying axial pressure to the fiber ends for bulging the fibers at said one end into intimately fused relation, permitting the fibers to cool, reheating the fibers in such a manner as to establish a temperature gradient therein so that the fibers will be heated to a fusing temperature only adjacent a plane extending transversely of the fibers at the opposite end of the fibers, simultaneously applying axial pressure to the fiber ends for bulging the fibers into intimately fused relation at said opposite ends, permitting the fibers to cool, and finishing the fiber ends for rendering them readily receptive to light.

8. A method of forming a fiber optical image transfer device, said method comprising the steps of assembling a plurality of light-conducting fibers of relatively uniform length in side-by-side relation to form a bundle, providing a metallic sleeve of a material to which said fibers are adapted to fuse, disposing said sleeve in enclosing relation to said bundle for holding said fibers in said bundled relation, heating the fibers and sleeve in such a manner as to establish at least a temporary temperature gradient therein so that the fibers will be first heated to a temperature sufficient to fuse the fibers to each other and to said sleeve in a plane extending transversely of the fibers at one end of the fibers and will then be heated to said temperature progressively along the fiber lengths from said plane, at the same time pressing axially against the fibers at the opposite ends thereof for bulging portions of the fibers into fused relation with each other and with said sleeve as they are heated to said fusing temperature, permitting the fibers and sleeve to cool, and finishing the ends of said fibers for rendering them readily receptive to light.

9. A method of forming a fiber optical image transfer device, said method comprising the steps of providing a multiplicity of light-conducting fibers each embodying a light-transmitting core of a material of relatively high index of refraction and a light-insulating cladding of a material of relatively low index of refraction, said fibers being of relatively uniform length, providing a metallic sleeve having an inner coating of said material of low index of refraction fused thereto, assembling said fibers in side-by-side relation to form a bundle, disposing the sleeve in enclosing relation to the bundle for holding said fibers in said bundled relation, heating the fibers and sleeve in such a manner as to establish at least a temporary temperature gradient therein so that the fibers will be first heated to a temperature sufficient to fuse the fibers to each other and to said inner coating in a plane extending transversely of the fibers at one end of the fibers and will then be heated to said temperature progressively along the fiber lengths from said plane, at the same time, pressing axially against the fibers at the opposite ends thereof for bulging portions of the fibers into fused relation with each other and with said sleeve as they are heated to said fusing temperature, permitting the fibers and sleeve to cool, and finishing the ends of said fibers for rendering them readily receptive to light.

10. Apparatus for fusing heat-softenable fibers comprising forming means adapted to enclose the periphery of a fiber bundle which embodies a plurality of said fibers in side-by-side relation, means for heating the fibers to fusing and softening temperature, and means for applying axial, compressive pressure to each of the opposite fiber ends for bulging heated and softened fibers into intimately fused relation.

11. Apparatus for fusing light-conducting fibers comprising forming means adapted to completely enclose the periphery of a fiber bundle which embodies a plurality of said fibers in side-by-side relation, means for heating the enclosed fibers from one end to establish at least a temporary temperature gradient therein so that the fibers can be first heated to a fusing and softening temperature in a plane extending transversely of the fibers at said end and can thereafter be heated to fusing and softening temperature progressively along the lengths of the fibers, and means for simultaneously applying axial pressure to the opposite fiber ends for bulging the softened fibers into intimately fused relation as they are heated to fusing and softening temperature.

12. Apparatus for forming a fiber optical image transfer device comprising a base member, means for detachably mounting a metallic sleeve against the base member so that the sleeve is adapted to receive a plurality of light-conducting fibers therein for holding said fibers in a bundle in side-by-side relation to each other with corresponding ends abutting the base member and for enclosing the periphery of said bundle, means for heating the base member to establish at least a temporary temperature gradient in the fibers so that the fibers can be first heated to a fusing and softening temperature in a plane extending transversely of the fibers adjacent the base member and can then be heated to a fusing and softening temperature progressively along the lengths of the fibers, and means adapted to fit closely within and to slide within the sleeve for simultaneously pressing all of the fibers axially against the base member as they are heated, thereby to bulge the softened fibers into intimately fused relation with each other and with said sleeve as they are heated to fusing temperature.

13. Apparatus for forming a fiber optical image transfer device comprising a base member, a forming member of refractory material mounted against said base member, said forming member having a chamber adapted to receive a plurality of light-conducting fibers in a bundle therein for holding said fibers in side-by-side relation to each other with corresponding ends abutting said base member and for enclosing the periphery of said bundle, a press member adapted to fit closely within and to slide in said forming member for simultaneously engaging the other ends of said fibers and for sealing the fibers within said forming member chamber, a vent passage extending through said press member exteriorly of said forming member chamber, means for establishing an oxidizing atmosphere within said chamber through said vent passage, means for thereafter establishing a vacuum within said chamber through said passage, means for heating said base member to preheat said fibers in said oxidizing atmosphere and then to establish at least a temporary temperature gradient in the fibers so that the fibers can be first heated to a fusing temperature in a plane extending transversely of the fibers adjacent said base member and can then be heated to a fusing temperature progressively along the lengths of the fibers, and means for pressing said press member toward said base member for simultaneously applying axial, compressive pressure to all of the fibers, thereby to bulge the fibers into intimately fused relation as they are heated to fusing temperature.

14. A method of fusing light-conducting fibers comprising the steps of assembling a plurality of said fibers in side-by-side relation to form a bundle, holding said fibers in said bundled relation, heating the fibers to a fusing and softening temperature to soften said fibers at least at one end thereof, and axially compressing the fibers at said one end for bulging said softened fibers into intimately fused relation at least at said one end.

References Cited by the Examiner
UNITED STATES PATENTS

| | | | |
|---|---|---|---|
| 2,026,606 | 1/36 | Bausch | 65—156 |
| 2,035,827 | 3/36 | Newell | 65—38 |
| 2,484,003 | 10/49 | Simison | 65—4 X |
| 2,779,134 | 1/57 | Gates | 65—156 X |
| 2,979,632 | 4/61 | MacNeille. | |
| 2,992,586 | 7/61 | Upton | 65—31 |
| 3,004,368 | 10/61 | Hicks | 65—4 |
| 3,033,071 | 5/62 | Hicks | 65—4 |
| 3,128,167 | 4/64 | Woodcock | 65—36 |

DONALL H. SYLVESTER, *Primary Examiner.*

ARTHUR P. KENT, *Examiner.*